United States Patent
Alberth et al.

(10) Patent No.: US 8,907,930 B2
(45) Date of Patent: Dec. 9, 2014

(54) METHODS AND DEVICES FOR DETERMINING USER INPUT LOCATION USING ACOUSTIC SENSING ELEMENTS

(75) Inventors: William Alberth, Prairie Grove, IL (US); Michael Schellinger, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 625 days.

(21) Appl. No.: 13/198,304

(22) Filed: Aug. 4, 2011

(65) Prior Publication Data

US 2012/0032928 A1 Feb. 9, 2012

Related U.S. Application Data

(60) Provisional application No. 61/371,457, filed on Aug. 6, 2010.

(51) Int. Cl.
*G06F 3/043* (2006.01)
*G06F 3/041* (2006.01)

(52) U.S. Cl.
CPC ............ *G06F 3/0418* (2013.01); *G06F 3/0433* (2013.01)
USPC ........................................ 345/177; 178/18.04

(58) Field of Classification Search
None
See application file for complete search history.

(56) References Cited

U.S. PATENT DOCUMENTS

| | | | |
|---|---|---|---|
| 5,182,774 A | 1/1993 | Bourk | |
| 7,157,649 B2 * | 1/2007 | Hill | 178/18.04 |
| 7,345,677 B2 | 3/2008 | Ing et al. | |
| 7,511,711 B2 | 3/2009 | Ing et al. | |
| 7,525,050 B1 * | 4/2009 | Weaver et al. | 178/18.04 |
| 7,583,255 B2 | 9/2009 | Ing | |
| 7,649,807 B2 | 1/2010 | Ing | |
| 7,999,797 B2 * | 8/2011 | Edpalm et al. | 345/177 |
| 8,085,124 B2 | 12/2011 | Ing | |
| 8,624,878 B2 * | 1/2014 | Sarwar et al. | 345/177 |
| 2001/0006006 A1 | 7/2001 | Hill | |
| 2005/0146512 A1 | 7/2005 | Hill et al. | |
| 2008/0316184 A1 * | 12/2008 | D'Souza | 345/173 |
| 2009/0116339 A1 | 5/2009 | Ing | |
| 2009/0122028 A1 | 5/2009 | Ing | |
| 2009/0195517 A1 | 8/2009 | Duheille et al. | |
| 2011/0037734 A1 * | 2/2011 | Pance et al. | 345/177 |
| 2011/0137968 A1 | 6/2011 | Ing | |
| 2011/0261655 A1 | 10/2011 | Aklil et al. | |

OTHER PUBLICATIONS

U.S. Appl. No. 12/844,468, filed Jul. 27, 2010, Methods and Devices for Determining User Input Location Based on Device Support Configuration.

Patent Cooperation Treaty, International Search Report and Written Opinion of the International Searching Authority for International Application No. PCT/US2011/046645, Dec. 16, 2011, 9 pages.

* cited by examiner

*Primary Examiner* — Alexander S Beck
*Assistant Examiner* — Mihir Rayan
(74) *Attorney, Agent, or Firm* — Morris & Kamlay LLP (57) ABSTRACT

Methods and devices are provided for determining location of an input on a surface of a device using an acoustic sensing element. An exemplary method begins by determining an anticipated acoustic response resulting from an output generated by a component of the device at the acoustic sensing element. The method continues by subtracting the anticipated acoustic response from a measured acoustic response at the acoustic sensing element to obtain a nominal acoustic response, and determining the location of the input based on the nominal acoustic response.

15 Claims, 3 Drawing Sheets

METHODS AND DEVICES FOR DETERMINING USER INPUT LOCATION USING ACOUSTIC SENSING ELEMENTS

CROSS-REFERENCE TO RELATED APPLICATION(S)

This application claims the benefit of U.S. provisional patent application Ser. No. 61/371,457, filed Aug. 6, 2010, the entire content of which is incorporated by reference herein.

TECHNICAL FIELD

Embodiments of the subject matter described herein relate generally to touch sensing applications, and more particularly, embodiments of the subject matter relate to using acoustic sensing elements to accurately locate user inputs on a surface of a device.

BACKGROUND

Many electronic devices use touch-based interfaces to receive input from the user. Some electronic devices may utilize sensors to detect acoustic waves propagating in the device and determine the location of touch inputs on a surface of the device based on the acoustic waves and known acoustic characteristics of the device, also known as the acoustic signature of the device.

Many electronic devices also include components that may produce acoustic waves that would interfere with acoustic waves resulting from touch inputs, thereby limiting the ability of the device to accurately determine the location of touch inputs. Accordingly, it is desirable to accurately determine the location of touch inputs on the surface of an electronic device using acoustic sensing-technologies while other components of the electronic device may be producing acoustic waves.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

For the sake of brevity, conventional techniques related to touch sensing, touch screen calibration and/or configuration, touch screens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Technologies and concepts discussed herein relate to utilizing acoustic sensing elements to locate user inputs on a surface of a device using acoustic sensing elements irrespective of output being generated by other components of the device. As described in greater detail below, a transfer function for the acoustic response attributable to output of a respective component of the device at the location of each acoustic sensing element is determined. When the component of the device is generating or otherwise producing an output, the transfer functions are used to calculate anticipated acoustic responses at each acoustic sensing element. The anticipated acoustic responses are subtracted from the measured acoustic responses at the respective acoustic sensing elements to obtain nominal acoustic responses. The nominal acoustic responses are utilized to determine the location of a user input on the surface of the device using an acoustic signature for the device, as described in greater detail below. In this manner, when user input is being received and output is being generated by the component of the device concurrently, the location of the user input may be accurately determined using the nominal acoustic responses.

Figure 1:
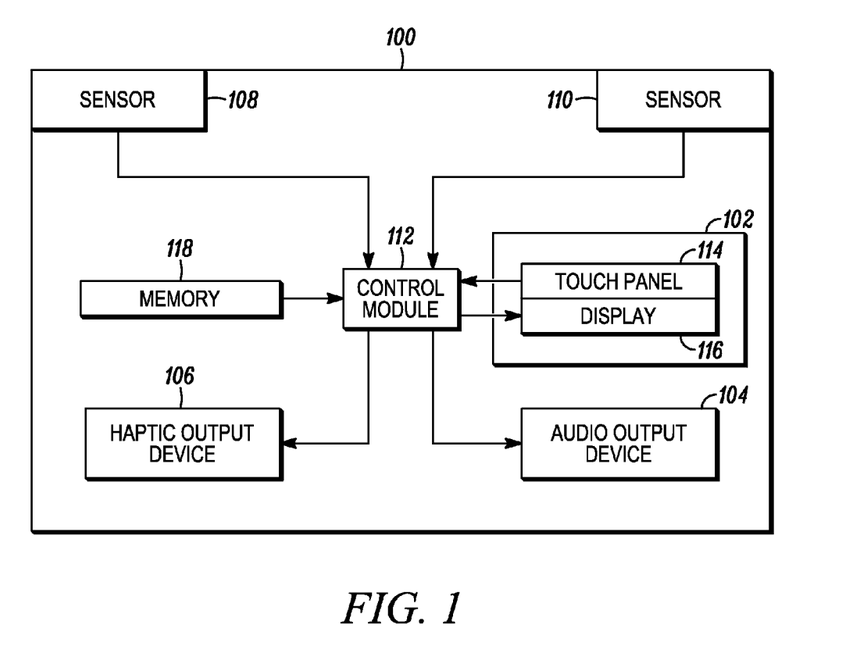
FIG. 1 is a block diagram of an exemplary electronic device in accordance with one embodiment.

FIG. 1 depicts an exemplary embodiment of electronic device 100. The electronic device 100 may be realized as a mobile communications device (e.g., cellular phone, personal digital assistant, and the like), a computer, a portable media player (e.g., a digital audio player, a digital video player, or the like), or another suitable electronic device. In an exemplary embodiment, the electronic device 100 includes, without limitation, a touch screen 102, one or more nonvisual output components 104, 106, a plurality of acoustic sensing elements 108, 110, a control module 112, and a suitable amount of memory 118. It should be understood that FIG. 1 is a simplified representation of an electronic device 100 for purposes of explanation and is not intended to limit the scope of the subject matter in any way. In this regard, although FIG. 1 depicts the electronic device 100 including two acoustic sensing elements 108, 110, practical embodiments of the electronic device 100 may include additional or fewer acoustic sensing elements to satisfy the needs of a particular application.

In an exemplary embodiment, the acoustic sensing elements 108, 110 measure, sense, detect, or otherwise obtain acoustic responses attributable to user input(s) on a surface of the electronic device 100. As used herein, a user input comprises an impact, tap, stroke, movement, marking, or the like, that is imparted by a user of the electronic device 100 to a surface of the electronic device 100, for example, by applying and/or pressing an input object (e.g., a finger, stylus, digital pen, or the like) to the surface of the electronic device 100. The contact between the input object and the electronic device 100 results in acoustic waves propagating throughout the electronic device 100 that influence the acoustic responses measured by the acoustic sensing elements 108, 110. In this regard, a measured acoustic response by an acoustic sensing element 108, 110 corresponds to the amplitude and frequency (or phase) of the acoustic waves sensed or detected by the respective acoustic sensing element 108, 110 at its respective location. In an exemplary embodiment, the measured acoustic response is an electrical signal provided by a respective sensing element 108, 110 to the control module 112 that reflects the amplitude and frequency (or phase) characteristics of the resulting acoustic waves at the location of the respective sensing element 108, 110. The measured acoustic response varies with respect to the location of the user input, and thus, measured acoustic responses may be utilized by the control module 112 to determine or otherwise resolve the location of contact between an input object and a surface of the electronic device 100, that is, the input location of a respective user input on the surface of the electronic device 100, as described in greater detail below.

The touch screen 102 provides a user interface with the electronic device 100 and includes a touch panel 114 and a display device 116. The touch panel 114 is realized as a transparent touch panel that is responsive to user input on the surface of touch panel 114. Depending on the embodiment, the touch panel 114 may be realized as a resistive touch panel or a capacitive touch panel, or the touch panel 114 may be realized using another suitable technology. The touch panel 114 is coupled to the control module 112, wherein the control module 112 is configured to resolve user input on the touch panel 114 to its corresponding location on the touch panel 114. The touch panel 114 is preferably disposed proximate the display device 116 and aligned with respect to the display device 116 such that the touch panel 114 is interposed in the line-of-sight between a user and the display device 116 when the user views content displayed on the display device 116. In this regard, from the perspective of a user and/or viewer of the touch screen 102 and/or display device 116, at least a portion of the touch panel 114 overlaps and/or overlies content displayed on the display device 116. In accordance with one embodiment, the touch panel 114 is substantially planar in shape and disposed adjacent to a substantially planar surface of the display device 116. For example, if the display device 116 has a substantially planar viewing area, the touch panel 114 may be aligned parallel to the planar viewing area of the display device 116. In accordance with one or more embodiments, the touch panel 114 is integral with the display device 116.

The display device 116 is realized as an electronic display configured to graphically display information and/or content under control of the control module 112. Depending on the embodiment, the display device 116 may be realized as a liquid crystal display (LCD), a cathode ray tube display (CRT), a light emitting diode (LED) display, an organic light emitting diode (OLED) display, a plasma display, or another suitable electronic display. The control module 112 is coupled to the display device 116, and the control module 112 controls the display and/or rendering of content on the display device 116 and correlates the location of a user input received on the touch panel 114 with the location of content displayed on the display device 116.

The nonvisual output components 104, 106 generally represent the components of the electronic device 100 configured to generate nonvisual feedback to a user of the electronic device 100 under control of the control module 112. In this regard, in an exemplary embodiment, the electronic device 100 includes an audio output device 104 and a haptic output device 106. The audio output device 104 may be realized as a speaker or another device configured to produce or otherwise generate auditory output in response to commands from the control module 112. The haptic output device 106 may be realized as a vibrator or another device configured to produce or otherwise generate haptic output in response to commands from the control module 112. Output generated by a nonvisual output component 104, 106, such as auditory sounds, vibrations, or the like, may result in acoustic waves propagating through the electronic device 100 that constructively interfere and/or destructively interfere with acoustic waves resulting from user input on a surface of the electronic device 100 and influence the measured acoustic responses at the sensors 108, 110, as described in greater detail below.

As illustrated by FIG. 1, the electronic device 100 includes at least two acoustic sensing elements 108, 110 that are disposed at different locations within the electronic device 100. In an exemplary embodiment, the acoustic sensing elements 108, 110 are in contact with a surface of the electronic device 100 that is intended to receive user input. In addition to being disposed at different locations, the acoustic sensing elements 108, 110 are also separated from each other by a distance that ensures decorrelation between the measured acoustic responses at the respective sensing elements 108, 110 resulting from a user input on a surface of the electronic device 100. In other words, the separation distance ensures that the measured acoustic responses at the respective sensing elements 108, 110 are equal for no more than one input location on the surface of the electronic device 100. In an exemplary embodiment, the acoustic sensing elements 108, 110 are realized as piezoelectric sensors configured to measure, sense, detect, or otherwise obtain the acoustic response resulting from or otherwise attributable to a user input on a surface of the electronic device 100 and provide an electrical signal indicative of the acoustic response to the control module 112, as described in greater detail below. Accordingly, for convenience and ease of explanation, but without limitation, the acoustic sensing elements 108, 110 may alternatively be referred to herein as sensors.

The control module 112 generally represents the hardware, software, and/or firmware components configured to determine or otherwise resolve the input location corresponding to user input, either on the touch screen 102 or a surface of the electronic device 100, and to perform additional tasks and/or functions described in greater detail below. The control module 112 also includes or otherwise accesses memory 118 capable of maintaining a plurality of device acoustic signatures for the electronic device 100, as well as transfer functions for acoustic response attributable to the nonvisual output components 104, 106 at the locations of the sensors 108, 110, as described in greater detail below.

Depending on the embodiment, the control module 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The control module 112 may also be implemented as a combination of computing devices, e.g., a combination of a digital signal processor and a microprocessor, a plurality of microprocessors, one or more microprocessors in conjunction with a digital signal processor core, or any other such configuration. In practice, the control module 112 includes processing logic that may be configured to carry out the functions, techniques, and processing tasks associated with the operation of the electronic device 100, as described in greater detail below. Furthermore, the steps of a method or algorithm described in connection with the embodiments disclosed herein may be embodied directly in hardware, in firmware, in a software module executed by the control module 112, or in any practical combination thereof.

In an exemplary embodiment, the control module 112 and the sensors 108, 110 are cooperatively configured to obtain an acoustic signature for the electronic device 100, alternatively referred to herein as a device acoustic signature. As described in greater detail below, a device acoustic signature includes an acoustic signature for each respective sensor 108, 110 that reflects the acoustic responses measured by the respective sensor 108, 110 (or the electrical signals produced or provided by the respective sensor 108, 110) resulting from user inputs at known locations on the surface of the electronic device 100.

In an exemplary embodiment, each device acoustic signature is associated with a particular support configuration for the electronic device 100. As set forth above, a support configuration should be understood as a predefined manner for gripping, holding, mounting, fastening, or otherwise providing physical support to the electronic device 100. In this regard, a support configuration corresponds to persistent physical contact points on one or more surfaces of the electronic device 100 that do not correspond to user inputs, but rather, provide substantially fixed mechanical support for the electronic device 100. For example, a first support configuration may correspond to a user holding the electronic device 100 to the user's left ear with the user's left hand, a second support configuration may correspond to the user holding the electronic device 100 to the user's right ear with the user's right hand, a third support configuration may correspond to the user holding the electronic device 100 in front of the user (e.g., the provide input to the electronic device 100), a fourth support configuration may correspond to the electronic device 100 being held or gripped by a mounting apparatus or support structure (e.g., a dock, cradle, holder, or the like), and so on.

As set forth above, a user input on a surface of the electronic device 100 produces a pattern of acoustic waves propagating through the electronic device 100. The physical contact points on the surface(s) of the electronic device 100 provided by a respective support configuration affect the acoustic characteristics of the electronic device 100, and thereby influence the manner in which acoustic waves propagate through the electronic device 100 (e.g., the manner in which the acoustic waves are attenuated) in response to the user input. Acoustic waves resulting from the user input produce a measurable acoustic response at each of the sensors 108, 110, and the amplitude and/or frequency characteristics of the acoustic response are influenced by the support configuration of the electronic device 100 and vary with respect to the location of the user input. Thus, each sensor 108, 110 has an acoustic signature for a particular support configuration that corresponds to a mapping between the measured acoustic responses and the known input locations for user inputs provided on a surface of the electronic device 100 while the electronic device 100 was in the particular support configuration, wherein the user inputs at the known input locations produce the corresponding measured acoustic responses.

In an exemplary embodiment, the control module 112 obtains a device acoustic signature for each of the possible support configurations for the electronic device 100, and stores or otherwise maintains the association between the support configuration and its corresponding device acoustic signature (e.g., the set of acoustic signatures for the sensors 108, 110 when the electronic device 100 is in the associated support configuration). For example, a first device acoustic signature for a first support configuration may be obtained by applying a series of impulse-style inputs having known input locations across one or more surfaces of the electronic device 100 while the electronic device 100 is maintained in the first support configuration, and the association between the known input locations and the measured acoustic responses at each sensor 108, 110 stored or otherwise maintained by the control module 112 as the device acoustic signature for a particular support configuration. For example, the electronic device 100 may be fixedly held or gripped in a first support configuration, and a series of inputs having known locations ($L_1, L_2, L_3 \ldots L_n$) applied across one or more surfaces of the electronic device 100. In an exemplary embodiment, at least some of the known input locations correspond to locations on the touch panel 114 and/or touch screen 102. In response to each known input, the first sensing element 108 obtains a measured acoustic response and provides an electrical signal indicative of the acoustic response at the location of the first sensing element 108 to the control module 112. The control module 112 obtains the acoustic signature for the first sensing element 108 by maintaining the association between the set of acoustic responses measured by the first sensing element 108 ($A_1, A_2, A_3 \ldots A_n$) and the known input locations ($L_1$-$L_n$). Similarly, in response to each known input, the second sensing element 110 obtains a measured acoustic response and provides an electrical signal indicative of the acoustic response at the location of the second sensing element 110 to the control module 112. The control module 112 obtains the acoustic signature for the second sensing element 110 by maintaining the association between the set of acoustic responses measured by the second sensing element 110 ($B_1, B_2, B_3 \ldots B_n$) and the known input locations. The control module 112 obtains or otherwise determines the device acoustic signature for the first support configuration as the association between the known input locations ($L_1$-$L_n$) and the measured acoustic responses ($A_1$-$A_n$, $B_1$-$B_n$) at the sensors 108, 110. As described in greater detail below, during operation of the electronic device 100, the device acoustic signature corresponding to the current support configuration of the electronic device 100 is used to resolve or otherwise determine the input locations for user inputs on a surface of the electronic device 100.

Figure 2:
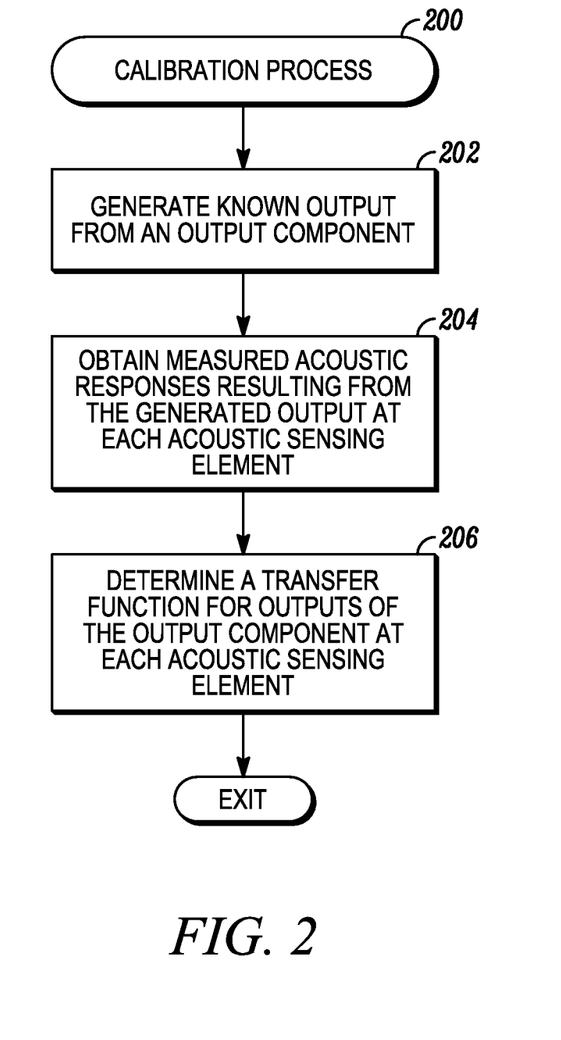
FIG. 2 is a flow diagram of a calibration process suitable for use with the electronic device of FIG. 1 in accordance with one embodiment.

Referring now to FIG. 2, in an exemplary embodiment, an electronic device may be configured to perform a calibration process 200 and additional tasks, functions, and/or operations as described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the touch screen 102, the nonvisual output components 104, 106, the sensors 108, 110, the control module 112, the touch panel 114 and/or display device 116. It should be appreciated any number of additional or alternative tasks may be included, and may be incorporated into a more comprehensive procedure or process having additional functionality not described in detail herein.

Referring to FIG. 2, and with continued reference to FIG. 1, the calibration process 200 may be performed to calibrate the electronic device 100 for one or more output components to enable the electronic device 100 to more accurately resolve input locations of user inputs imparted to a surface of the electronic device 100 when the respective output component generates output that is likely to produce acoustic waves at the locations of the acoustic sensing elements 108, 110. In some embodiments, the calibration process 200 may be performed before the electronic device 100 is deployed (e.g., in the factory).

In an exemplary embodiment, the calibration process 200 begins by generating a known output from an output component and obtaining measured acoustic responses attributable to the output of the output component at the location of each acoustic sensing element of the electronic device (tasks 202, 204). In this regard, the control module 112 commands, signals or otherwise instructs a respective nonvisual output component 104, 106 to generate a known output and obtains the acoustic responses resulting from the known output signal that are measured, sensed, or otherwise detected by sensors 108, 110 at their respective locations. In accordance with one embodiment, the control module 112 commands or signals the nonvisual output component 104, 106 to generate the known output with a substantially even power distribution across the range of possible (or likely) output frequencies for the nonvisual output component 104, 106. For example, the control module 112 may instruct or otherwise provide drive signals to cause the audio output device 104 to generate a white noise audio output signal as the known output. In an exemplary embodiment, the white noise audio output signal is bandlimited to the expected frequency range for the output generated by the audio output device 104 during normal operation of the electronic device 100 . . . In response to the white noise audio output signal, each sensor 108, 110 measures an acoustic response corresponding to the acoustic waves at the location of the respective sensor 108, 110 that are attributable to the white noise audio output signal. In another embodiment, the control module 112 instruct or otherwise provide drive signals to cause the audio output device 104 to execute a frequency sweep across the expected frequency range for the output generated by the audio output device 104 during normal operation of the electronic device 100. In other words, the audio output device 104 may generate an audio output signal or tone that sweeps through the expected frequency range for the audio output device 104 to provide the known output.

In an exemplary embodiment, the calibration process 200 continues by determining a transfer function for acoustic response attributable to output generated by the respective output component at each acoustic sensing element (task 206). In this regard, the control module 112 determines a transfer function for acoustic response from a respective nonvisual output component 104, 106 at a respective sensor 108, 110 based on the relationship between the measured acoustic response at a respective sensor 108, 110 and the known output generated by the respective nonvisual output component 104, 106. For example, the control module 112 may determine a first transfer function for the audio output device 104 at the first sensor 108 as a ratio of the measured acoustic response at the first sensor 108 attributable to the white noise audio output signal generated by the audio output device 104 to the white noise audio output signal generated by the audio output device 104. Similarly, the control module 112 may determine a second transfer function for the audio output device 104 at the second sensor 110 as a ratio of the measured acoustic response at the second sensor 110 attributable to the white noise audio output signal generated by the audio output device 104 to the white noise audio output signal generated by the audio output device 104. The transfer functions for the audio output device 104 at the sensors 108, 110 may be stored or otherwise maintained by the control module 112 in memory 118.

As described in greater detail below, the transfer functions are utilized to determine anticipated acoustic responses attributable to outputs generated by a respective nonvisual output component 104, 106 during subsequent operation of the electronic device 100. Thus, in an exemplary embodiment, the calibration process 200 is performed for each nonvisual output component 104, 106 of the electronic device 100 to obtain individual transfer functions at the sensors 108, 110 corresponding to each respective nonvisual output component 104, 106. In this regard, the control module 112 may command, signal or otherwise instruct the haptic output device 106 to generate a known output, for example, by commanding the haptic output device 106 to vibrate the electronic device 100 at a predetermined frequency (or across a range of predetermined frequencies or pulses), obtain the resulting acoustic responses at sensors 108, 110, and determine transfer functions for the haptic output device 106 at the sensors 108, 110 based on the relationship between the measured acoustic responses at a respective sensor 108, 110 and the known output generated by the haptic output device 106. In accordance with one or more embodiments, the calibration process 200 may be repeated for each nonvisual output component 104, 106 for each possible support configuration of the electronic device 100. For example, the electronic device 100 may be fixedly held or gripped in a first support configuration (e.g., a left-handed support configuration) and the calibration process 200 performed to obtain a transfer function for the audio output device 104 associated with the first support configuration, and the electronic device 100 may be fixedly held or gripped in a second support configuration (e.g., a right-handed support configuration) and the calibration process 200 performed to obtain a transfer function for the audio output device 104 associated with the second support configuration, and so on for each possible support configuration.

Figure 3:
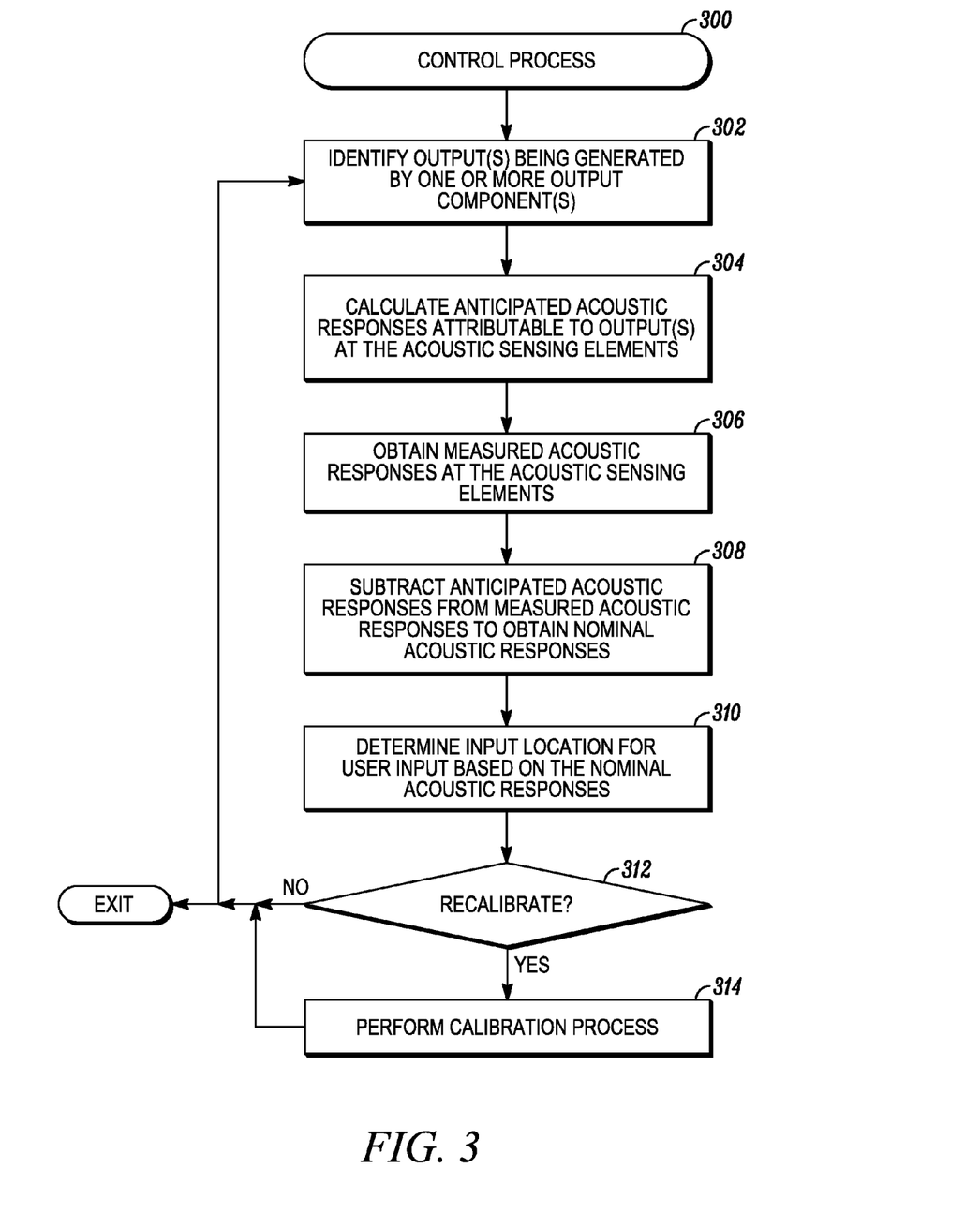
FIG. 3 is a flow diagram of a control process suitable for use with the electronic device of FIG. 1 in accordance with one embodiment.

Referring now to FIG. 3, in an exemplary embodiment, an electronic device may be configured to perform a control process 300 and additional tasks, functions, and/or operations as described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the touch screen 102, the nonvisual output components 104, 106, the sensors 108, 110, the control module 112, the touch panel 114 and/or display device 116. It should be appreciated any number of additional or alternative tasks may be included, and may be incorporated into a more comprehensive procedure or process having additional functionality not described in detail herein.

Referring to FIG. 3, and with continued reference to FIG. 1, the control process 300 may be performed to enable the electronic device 100 to more accurately resolve input locations of user inputs imparted to a surface of the electronic device 100 while n output component 104, 106 is concurrently generating an output likely to influence the measured acoustic responses at the sensors 108, 110. The control process 300 begins by identifying output(s) being generated by one or more output components and calculating or otherwise determining anticipated acoustic response(s) attributable to the output(s) generated by the one or more output components at each acoustic sensing element (tasks 302, 304). In this regard, using the transfer function for a respective nonvisual output component 104, 106 at a respective sensor 108, 110 and the output being generated by the respective nonvisual output component 104, 106, the control module 112 calculates an anticipated or theoretical acoustic response that the output generated by the respective nonvisual output component 104, 106 would likely produce at the respective sensor 108, 110. For example, the control module 112 may command, signal, or instruct a nonvisual output component 104, 106 to provide feedback to a user of the electronic device 100 (e.g., to indicate selection of an item from a list presented on the display device 116, indicate an incoming phone call, or the like). In response to identifying the output being generated by the nonvisual output component 104, 106, the control module 112 calculates anticipated acoustic responses at the sensors 108, 110 based on the known output commanded by the control module 112. For example, the control module 112 may calculate an anticipated acoustic response at the first sensor 108 ($A_x$) resulting from a known auditory output generated by the audio output device 104 by applying the transfer function for acoustic response from the audio output device 104 at the first sensor 108 to the auditory output being generated by the audio output device 104. Similarly, the control module 112 may calculate an anticipated acoustic response at the second sensor 110 ($B_x$) by applying the transfer function for acoustic response from the audio output device 104 at the second sensor 110 to the generated auditory output.

In an exemplary embodiment, the control process 300 continues by obtaining the measured acoustic responses at the acoustic sensing elements and subtracting or otherwise removing the anticipated acoustic response at each acoustic sensing element from its measured acoustic response to obtain a nominal acoustic response at the respective acoustic sensing element (task 306, 308). As described above, the sensors 108, 110 measure, sense, or otherwise detect acoustic waves at their respective locations, and provide the measured acoustic response to the control module 112, and the output of the nonvisual output component(s) 104, 106 may produce acoustic waves that constructively interfere and/or destructively interfere with acoustic waves resulting from user input concurrently provided on a surface of the electronic device 100. In this manner, the measured acoustic responses at the sensors 108, 110 ($A_m$, $B_m$) are influenced by the output generated by the nonvisual output component(s) 104, 106. In response to obtaining the measured acoustic responses at the first sensor 108, the control module 112 subtracts the anticipated acoustic response at the first sensor 108 attributable to output generated by a nonvisual output component 104, 106 from the measured acoustic response at the first sensor 108 to obtain a nominal acoustic response at the first sensor 108 ($A_n = A_m - A_x$). Similarly, the control module 112 subtracts the anticipated acoustic response at the second sensor 110 attributable to the output generated by the nonvisual output component 104, 106 from the measured acoustic response at the second sensor 110 to obtain a nominal acoustic response at the second sensor 110 ($B_n = B_m - B_x$). In this manner, the acoustic responses attributable to output generated by a nonvisual output component 104, 106 are removed or otherwise nullified at the locations of the sensors 108, 110.

In an exemplary embodiment, the control process 300 continues by determining the input location for a user input on a surface of the electronic device based on the nominal acoustic responses and the device acoustic signature (task 310). In this regard, the control module 112 determines the location of the user input by using the device acoustic signature corresponding to the current support configuration and the nominal acoustic responses. In this regard, the control module 112 compares the entire set of stored acoustic responses ($A_1$-$A_n$, $B_1$-$B_n$) for the current support configuration to the nominal acoustic responses ($A_n$, $B_n$), identifies the set of stored acoustic responses ($A_i$, $B_i$) from the entire set of stored acoustic responses ($A_1$-$A_n$, $B_1$-$B_n$) for the current support configuration that are closest to the nominal acoustic responses ($A_n$, $B_n$), and determines the input location for the user input as the known input location ($L_i$) corresponding to the set of stored acoustic responses ($A_i$, $B_i$) that are closest to the nominal acoustic responses ($A_n$, $B_n$). In this manner, the effect of the output of a nonvisual output component 104, 106 on the determination of the input location using acoustic responses measured by sensors 108, 110 is reduced.

In an exemplary embodiment, the control process 300 continues by identifying or otherwise determining whether the electronic device needs to be recalibrated to obtain updated transfer functions for one or more of the output components (task 312). For example, over time, the output characteristics of a nonvisual output component 104, 106 may change due to aging and normal wear and tear, which in turn produces a corresponding change in the acoustic waves at the sensors 108, 110 that would result from output being generated by a nonvisual output component 104, 106. In this regard, the control module 112 may detect or otherwise identify a recalibration condition indicative of a need to update the transfer functions for the nonvisual output components 104, 106. In accordance with one embodiment, the control module 112 implements a timer to identify a recalibration at regular, periodic intervals (e.g., every 28 days, every 200 hours, or the like). In response to identifying a recalibration condition, the control process 300 continues by performing a calibration process (e.g., calibration process 200) to obtain updated transfer functions for the output components at the respective acoustic sensing elements (task 314). In accordance with one embodiment, before performing calibration process 200, the control module 112 prompts a user of the electronic device 100 for permission or authorization to perform the calibration process 200 to prevent the known outputs generated by the nonvisual output components 104, 106 during recalibration (e.g., task 202) and creating an undesirable disturbance. In the absence of a recalibration condition, the loop defined by tasks 302, 304, 306, 308, 310 and 312 may repeat as desired throughout operation of the electronic device 100 to accurately resolve the input locations for user inputs on a surface of the electronic device 100 using acoustic responses measured by the sensors 108, 110.

In accordance with another embodiment, the control module 112 identifies a recalibration condition when the input location for a user input determined based on the nominal acoustic responses and the device acoustic signature deviates from a verified input location by more than a threshold amount. For example, the control module 112 may obtain, from the touch panel 114, a verified input location for a user input imparted on the touch panel 114 and/or touch screen 102 and compare the verified input location to the input location determined using the nominal acoustic responses and the device acoustic signature. In response to determining that the difference between the verified input location and the input location determined using the nominal acoustic responses is greater than the threshold amount, the control process 300 may identify that the electronic device needs to be recalibrated and perform a calibration process (e.g., calibration process 200) to obtain updated transfer functions for the output components at the respective acoustic sensing elements (task 314). In response to determining that the difference between the verified input location and the input location determined using the nominal acoustic responses is not greater than the threshold amount, the loop defined by tasks 302, 304, 306, 308, 310 and 312 may repeat as desired throughout operation of the electronic device 100 to accurately resolve the input locations for user inputs on a surface of the electronic device 100 using acoustic responses measured by the sensors 108, 110.

To briefly summarize, one advantage of the methods described above is that acoustic interference caused by output from one or more components of the electronic device is nullified at the locations of the acoustic sensing elements, thereby allowing the electronic device to accurately determine the location of user input that is provided to a surface of the electronic device concurrently with the output being generated by the component(s) of the electronic device. Over time, the electronic device may be recalibrated to account for aging of the components which may result in changes to the acoustic waves generated by the components. In this manner, the location of user inputs on a surface of the electronic device may be more accurately determined using acoustic sensing elements.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for determining location of an input on a surface of a device using an acoustic sensing element, the method comprising:
    determining an anticipated acoustic response at the acoustic sensing element resulting from an output generated by a component of the device by applying a transfer function for acoustic response attributable to the component of the device at a location of the acoustic sensing element to the output generated by the component of the device;
    subtracting the anticipated acoustic response from a measured acoustic response at the acoustic sensing element to obtain a nominal acoustic response;
    determining the location of the input based on the nominal acoustic response;
    identifying a recalibration condition; and
    determining an updated transfer function for acoustic response attributable to the component of the device at the location of the acoustic sensing element in response to identifying the recalibration condition.

2. The method of claim 1, wherein identifying the recalibration condition comprises identifying a difference between the location of the input based on the nominal acoustic response and a verified location for the input is greater than a threshold value.

3. The method of claim 2, further comprising determining the verified location using a touch panel having the input provided thereon.

4. The method of claim 1, further comprising:
    generating a known output by the component of the device;
    obtaining acoustic response attributable to the known output at the location of the acoustic sensing element; and
    determining the transfer function for acoustic response attributable to the component of the device at the location of the acoustic sensing element based on a relationship between the acoustic response attributable to the known output at the location of the acoustic sensing element and the known output.

5. A method for determining location of an input on a surface of a device using an acoustic sensing element, the method comprising:
    generating a known output by a component of the device;
    obtaining acoustic response attributable to the known output at a location of the acoustic sensing element;
    determining a transfer function for acoustic response attributable to the component of the device at the location of the acoustic sensing element based on a relationship between the acoustic response attributable to the known output at the location of the acoustic sensing element and the known output;
    determining an anticipated acoustic response at the acoustic sensing element resulting from an output generated by a component of the device by applying the transfer function for acoustic response attributable to the component of the device at the location of the acoustic sensing element to the output generated by the component of the device;
    subtracting the anticipated acoustic response from a measured acoustic response at the acoustic sensing element to obtain a nominal acoustic response; and
    determining the location of the input based on the nominal acoustic response, wherein:
        the component of the device comprises an audio output device; and
        generating the known output comprises generating a known auditory signal by the audio output device.

6. The method of claim 5, wherein generating the known auditory signal comprises generating a white noise signal by the audio output device.

7. A method for determining location of an input on a surface of a device using an acoustic sensing element, the method comprising:
    generating a known output by a component of the device;
    obtaining acoustic response attributable to the known output at a location of the acoustic sensing element;
    determining a transfer function for acoustic response attributable to the component of the device at the location of the acoustic sensing element based on a relationship between the acoustic response attributable to the known output at the location of the acoustic sensing element and the known output;
    determining an anticipated acoustic response at the acoustic sensing element resulting from an output generated by a component of the device by applying the transfer function for acoustic response attributable to the component of the device at the location of the acoustic sensing element to the output generated by the component of the device;

subtracting the anticipated acoustic response from a measured acoustic response at the acoustic sensing element to obtain a nominal acoustic response; and determining the location of the input based on the nominal acoustic response, wherein:

the component of the device comprises a haptic output device; and generating the known output comprises generating a known haptic output by the haptic output device.

8. The method of claim 7, wherein generating the known haptic output comprises vibrating the device with a predetermined frequency.

9. A device comprising:

an acoustic sensing element configured to obtain a measured acoustic response in response to an input on a surface of the device;

a component configured to generate an output; and a control module coupled to the acoustic sensing element and the component, wherein the control module is configured to:

cause the component to generate a known output;

obtain acoustic response attributable to the known output from the acoustic sensing element;

determine a transfer function for acoustic response attributable to the component of the device at the acoustic sensing element based on a relationship between the acoustic response attributable to the known output and the known output;

determine an anticipated acoustic response resulting from the output at the acoustic sensing element by applying the transfer function to the output generated by the component of the device;

subtract the anticipated acoustic response from the measured acoustic response to obtain a nominal acoustic response;

determine the location of the input on the surface based on the nominal acoustic response;

identify a recalibration condition; and determine an updated transfer function for acoustic response attributable to the component of the device at the acoustic sensing element in response to identifying the recalibration condition.

10. The device of claim 9, further comprising a touch panel coupled to the control module, the input being provided on the touch panel, wherein the control module is configured to:

obtain a verified location for the input from the touch panel; and identify the recalibration condition when a difference between the verified location and the location of the input determined based on the nominal acoustic response is greater than a threshold value.

11. A device comprising:

an acoustic sensing element configured to obtain a measured acoustic response in response to an input on a surface of the device;

an audio output device configured to generate an output; and a control module coupled to the acoustic sensing element and the audio output device, wherein the control module is configured to:

cause the audio output device to generate a known output comprising a bandlimited white noise signal;

obtain acoustic response attributable to the known output from the acoustic sensing element;

determine a transfer function for acoustic response attributable to the audio output device at the acoustic sensing element based on a relationship between the acoustic response attributable to the known output and the known output;

determine an anticipated acoustic response resulting from the output at the acoustic sensing element by applying the transfer function to the output generated by the audio output device;

subtract the anticipated acoustic response from the measured acoustic response to obtain a nominal acoustic response; and determine the location of the input on the surface based on the nominal acoustic response.

12. A device comprising:

an acoustic sensing element configured to obtain a measured acoustic response in response to an input on a surface of the device;

a haptic output device configured to generate an output; and a control module coupled to the acoustic sensing element and the haptic output device, wherein the control module is configured to:

cause the haptic output device to generate a known output comprising a predetermined vibration frequency;

obtain acoustic response attributable to the known output from the acoustic sensing element;

determine a transfer function for acoustic response attributable to the haptic output device at the acoustic sensing element based on a relationship between the acoustic response attributable to the known output and the known output;

determine an anticipated acoustic response resulting from the output at the acoustic sensing element by applying the transfer function to the output generated by the haptic output device;

subtract the anticipated acoustic response from the measured acoustic response to obtain a nominal acoustic response; and determine the location of the input on the surface based on the nominal acoustic response.

13. A method for determining location of an input on a surface of a device using an acoustic sensing element, the method comprising:

calculating an anticipated acoustic response at the acoustic sensing element based on an output generated by a component of the device using a transfer function for acoustic response resulting from the component at the acoustic sensing element;

determining a nominal acoustic response at the acoustic sensing element based on the anticipated acoustic response and a measured acoustic response at the acoustic sensing element;

determining the location of the input on the surface of the device based on the nominal acoustic response and an acoustic signature for the device;

determining whether a difference between the location of the input and a verified location for the input is greater than a threshold value; and determining an updated transfer function for acoustic response resulting from the component at the acoustic sensing element in response to determining the difference between the location of the input and the verified location is greater than the threshold value.

14. The method of claim 13, wherein determining the nominal acoustic response comprises subtracting the anticipated acoustic response from the measured acoustic response.

15. The method of claim 14, wherein calculating the anticipated acoustic response comprises applying the transfer function for acoustic response resulting from the component at a location of the acoustic sensing element to the output generated by the component of the device.

* * * * *